Sept. 24, 1957 H. W. KAUFMANN 2,807,730

DIFFERENCER CIRCUIT

Filed Feb. 14, 1955 2 Sheets-Sheet 1

INVENTOR
HENRY WILLIAM KAUFMANN

BY Charles C. English
AGENT

INVENTOR
HENRY WILLIAM KAUFMANN

BY Charles C. English
AGENT

United States Patent Office 2,807,730

Patented Sept. 24, 1957

2,807,730

DIFFERENCER CIRCUIT

Henry W. Kaufmann, Upper Providence Township, Montgomery County, Pa., assignor to Sperry Rand Corporation, a corporation of Delaware Application February 14, 1955, Serial No. 488,066

21 Claims. (Cl. 307—106)

The present invention relates to electronic pulse responsive circuits and is more particularly concerned with circuits adapted to take a finite difference comparable to differentiation in a pulse envelope system.

It is often desired to provide devices for use with pulse type systems, particularly for going into pulse envelope systems. In effecting such a conversion, a device must be employed which is capable of accepting a train of pulses and thereafter producing a single pulse at the beginning only of the said train. The foregoing operation corresponds to the taking of a finite difference in a pulse system and is comparable with differentiation in pulse envelope systems. Thus, if a pulse type device is used for functions comparable with those for which a continuous-output device (e. g. a vacuum tube with D. C. plate supply and no separate carrier introduction) is employed, then where the latter's output must be differentiated, the output of the former must be differenced. For instance, a vacuum tube binary counter will ordinarily give a steady output from a particular terminal when in the "zero" condition. To produce a pulse upon its transition to the "zero" condition, for the purpose of stepping a succeeding counter stage, the "zero" output is differentiated. A pulse-type half-wave output counter will give a continuing series of pulses to signify, e. g. a zero; to step a succeeding counter stage only once for each reversion to the zero state, the train of pulses must be differenced to reduce it to a single pulse. Circuits permitting such operation are accordingly highly desirable and of great utility in various pulse type apparatuses such as computers.

In effecting the foregoing operation, the present invention utilizes a pair of amplifiers interconnected with one another and with a gating device whereby an input series of pulses produces a single pulse only at the output of the network. The said network then produces no outputs until after a predetermined delay period has been effected between received trains of pulses. While various types of amplifiers may be employed in the practice of the present invention, in accordance with a preferred embodiment magnetic amplifiers are utilized inasmuch as the use of such magnetic amplifiers produces a differencer circuit of the type herein contemplated which is more rugged in construction, more reliable in operation, and which may be made in smaller sizes than those utilizing other forms of amplifiers heretofore employed.

It is accordingly an object of the present invention to provide a pulse responsive circuit producing a single pulse at the beginning of a series of input pulses.

A further object of the present invention resides in the provision of a differencer circuit utilizing magnetic amplifiers.

Still another object of the present invention resides in the provision of a differencer circuit which is smaller in physical configuration, more rugged in construction, and more reliable in operation than has been the case heretofore.

A still further object of the present invention resides in the provision of a device adapted to be employed in pulse systems and capable of taking a finite difference in such systems comparable with differentiation in a pulse envelope system.

In effecting the foregoing objects, the differencer circuit of the present invention preferably employs magnetic amplifiers of two different types. The first of these types is termed a complementer and in this respect it should be noted that a complementer or a complementing amplifier is by definition one which will give an output when no input is presented thereto, or on the contrary one which gives no output when there is in fact an input. The second type of amplifier employed is termed a non-complementer or a non-complementing amplifier, and in this respect such an amplifier is defined as one which will not produce an output signal unless an input signal is presented thereto. Various types of such complementing and non-complementing amplifiers may be employed in the practice of the present invention, and in particular reference is made to the copending applications of Theodore H. Bonn and Robert D. Torrey, Serial No. 402,858, filed January 8, 1954, for "Signal Translating Device"; and to the copending application of John Presper Eckert, Jr. and Theodore H. Bonn, Serial No. 382,180, filed September 24, 1953, for "Signal Translating Device." Each of the foregoing applications has been assigned to the assignee of the instant application, and it is to be understood that the present invention may utilize the forms of amplifiers disclosed in the said prior copending applications, as well as the particular forms to be described. Even further variations will readily suggest themselves to those skilled in the art.

In accordance with the present invention, a complementing and a non-complementing amplifier are connected in series with one another in arbitrary order, and the output of the amplifier chain so formed is fed to one control input of a permissive gating device. Input pulse trains may then be fed to the input of the said amplifier chain as well as to a further controlling input of the said gating device, and the resultant circuit produces, at the output of the said gating device, a single pulse corresponding to the first pulse only of an input train of pulses. In practice, the amplifier chain alone will, due to its use of both a complementing and non-complementing amplifier, produce output pulses continuously up to and including the time of arrival of the first pulse of an incoming series. The amplifier chain will then produce no outputs until the second pulse period after the series of incoming pulses has ended. This operation thus permits the taking of a finite difference in a pulse system comparable with differentiation in a pulse envelope system.

The foregoing objects, advantages and operation of the present invention will become more readily apparent from the following description and accompanying drawings, in which.

As has been discussed previously, the differencer circuit of the present invention preferably employs an amplifier chain including both a complementing and a non-complementing amplifier. In accordance with a preferred embodiment of the present invention, these amplifiers comprise magnetic amplifiers, and such magnetic amplifiers may preferably, but not necessarily, utilize magnetic cores exhibiting a substantially rectangular hysteresis loop of the type shown in Figure 1. Such cores may be made of a variety of materials, among which are various types of ferrites and various kinds of magnetic tapes, including Orthonik and 4–79 Moly-Permalloy. These magnetic materials may in turn be given different heat treatments to effect different desired properties. In addition to the wide variety of materials applicable, the cores of the magnetic amplifiers which may be employed may be constructed in a number of different geometries, including both closed and open paths. For example, cup-shaped cores, strips of material, or toroidal cores are possible. It must be emphasized that the present invention is not limited to any specific geometries of its core nor to any specific materials therefor, and the examples to be given are illustrative only. In the following description bar type cores have been utilized for ease of representation and for facility in showing winding directions. However, neither the precise core configuration nor the precise hysteretic character of core material to be discussed is mandatory, and many variations will suggest themselves to those skilled in the art.

Figure 1:
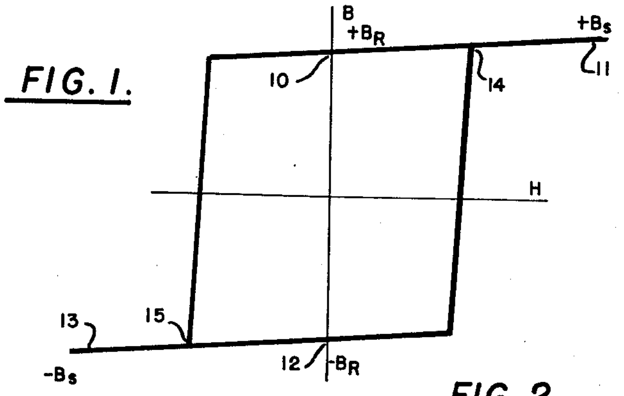
Figure 1 is an idealized hysteresis loop of a magnetic material which may preferably be employed in the cores of magnetic amplifiers utilized in the present invention.

Referring now to the hysteresis loop shown in Figure 1, it will be noted that the curve exhibits several significant points of operation, namely, point 10 (+B*r*) which represents a point of plus remanence; the point 11 (+B*s*) which represents plus saturation; the point 12 (−B*r*) which represents minus remanence; the point 13 (−B*s*) which represents minus saturation; the point 14 which represents the beginning of the plus saturation region; and the point 15 which represents the beginning of the minus saturation region.

Discussing for the moment the operation of a device utilizing a core which exhibits a hysteresis loop such as has been shown in Figure 1, let us assume that a coil is wound on the said core. If we should initially assume that the core is at an operating point 10 (plus remanence) and if a voltage pluse should be applied to the coil which produces in the said coil a current creating a magnetomotive force in a direction tending to increase the flux in the said core (i. e. in a direction of +H), the core will tend to be driven from the point 10 (+B*r*) to point 11 (+B*s*). During this state of operation there is relatively little flux change through the said coil and the coil therefore presents a relatively low impedance, whereby energy fed to the said coil during this state of operation will pass readily therethrough and may be readily utilized to effect a usable output.

On the other hand, if the core should initially be at point 12 (−B*r*) prior to the application of the said +H pulse, upon application of such a pulse the core will tend to be driven from the said point 12 to the region of plus saturation. The pulse magnitude should preferably be so selected that the core is driven only to the beginning of the plus saturation region, namely, to point 14. During this particular state of operation there is a relative large flux change through the said coil and the coil therefore exhibits a relatively high impedance to the applied pulse. As a result, substantially all the energy applied to the coil when the core is initially at −B*r*, point 12, will be expended in flipping the core from the said point 12 to the region of plus saturation (preferably to point 14) and thence to point 10, with very little of this energy actually passing through the said coil to give a usable output. Thus, depending upon whether the core is initially at point 10 (+B*r*) or at point 12 (−B*r*), an applied pulse in the +H direction will be presented respectively with either a low impedance or a high impedance and will effect either a relatively large output or a relatively small output. These considerations are of great value in the construction of magnetic amplifiers such as may be utilized in the present invention.

Figure 5:
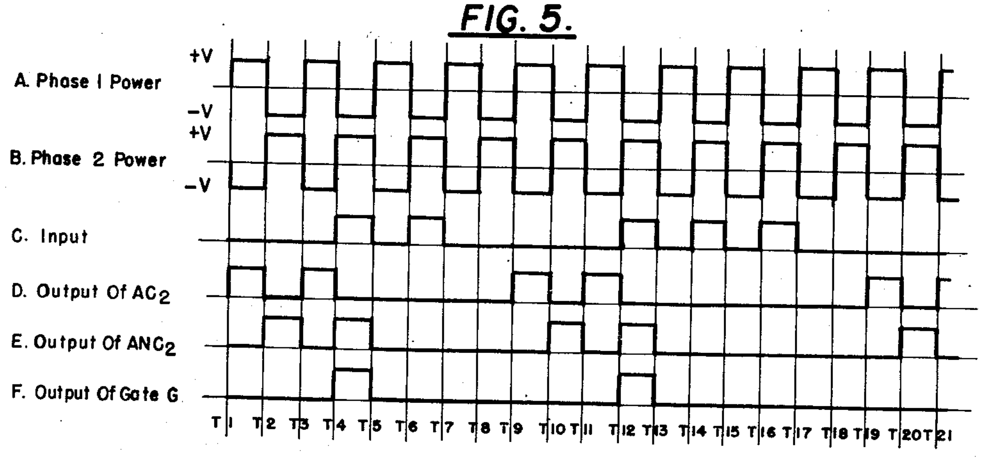
Figure 5 (A through F) is a waveform diagram illustrating the operation of the differencer circuit shown in Figure 4.
Figure 6:
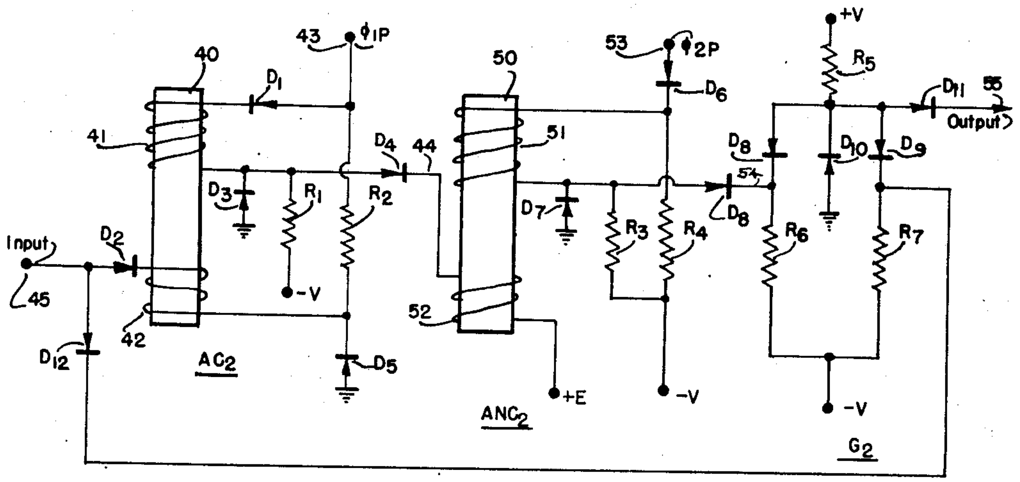
Figure 6 is a schematic diagram of a differencer circuit employing magnetic amplifiers and constructed in accordance with the logic of Figure 4.

Referring now to Figure 6, one form of the present invention utilizing magnetic amplifiers of both the complementing and non-complementing type have been disclosed. These particular amplifier configurations will now be individually discussed so that their operation may be appreciated. A complementing magnetic amplifier, in accordance with the present invention, may, as shown in Figure 6, comprise a core 40 of magnetic material, preferably but not necessarily exhibiting a hysteresis loop of the type discussed in reference to Figure 1. The core 40 bears two windings thereon, namely, a winding 41 which is termed the power or output winding and a signal or input winding 42. One end of the power winding 41 is coupled to a diode D1, poled as shown, and the diode D1 is in turn connected to an input terminal 43 supplied with a train of positive and negative going power pulses such as is shown in Figure 5A.

As will be noted from an examination of Figure 6, the terminal 43 is supplied with a train of "phase 1 power pulses" and this term merely refers to such positive and negative going pulses timed with respect to an arbitrary datum. The other of the amplifiers to be discussed will utilize "phase 2 power pulses" and it is to be understood that this latter term again refers to pulses of the same form as the phase 1 pulses with the sole exception that a positive going portion of a phase 1 pulse coincides with a negative going portion of a phase 2 pulse and vice versa. Again, it will become apparent from the following description that the several power pulses cooperate with input pulses to selectively produce or inhibit an output from the amplifier in question. These input pulses must occur during a negative-going portion of the power pulse with which it is to cooperate (or with a positive-going portion of the said power pulses if the winding directions and diodes are reversed). In this respect therefore when I speak of a "phase 1 input pulse" it is to be understood that this term refers to an input pulse capable of cooperating with a phase 1 power pulse; and similarly, a "phase 2 input pulse" is one capable of cooperating with a phase 2 power pulse, thereby to produce or inhibit an amplifier output. A phase 1 input pulse cannot cooperate with a phase 2 power pulse nor can a phase 2 input pulse cooperate with a phase 1 power pulse.

Returning now to the system shown in Figure 6, and making reference to the complementing magnetic amplifier utilizing the core 40, let us initially assume that the core is at its plus remanence point 10 (see Figure 1). If now a positive-going power pulse should be applied at the terminal 43 during a time interval *t1* to *t2* (Figure 5A), the power pulse so applied will cause a current to flow through the diode D1, through the relatively low impedance exhibited by power winding 41, and thence through the diode D4, whereby a substantial output pulse will appear at the point 44 during the time *t1* to *t2* (Figure 5D). At the time *t2* and in the absence of any signal input, the core 40 will return to its operating point 10 and the next positive-going power pulse, applied during the time *t3* to *t4* for instance, will again drive the core to plus saturation, again giving an output during this time interval *t3* to *t4*. Thus, in the absence of any other inputs, if the core 40 should initially be at its plus remanence operating point, successive positive-going power pulses will cause successive outputs to appear at output point 44.

Let us now assume that an input pulse is applied via the diode D2 during a time interval *t4* to *t5* (Figure 5C). This input pulse will cause current to pass through the said diode D2 and thence through the said coil 42 and inasmuch as the said coil 42 is wound in a direction opposite to that of output coil 41, the input pulse so applied will effect a —H magnetizing force on the core 40. Thus, during the time $t4$ to $t5$, the application of an input pulse, as described, will cause the core 40 to be flipped in a counterclockwise direction from its plus remanence operating point 10 to the region of its minus remanence operating point 12; and at the time $t5$ the core will thus find itself at this minus remanence operating point preparatory to the reception of the next positive going power pulse applied via diode D1 during the time $t5$ to $t6$. This next positive-going power pulse will therefore find the coil 41 to present a relatively high impedance and as a result substantially all the energy presented by the said power pulse will be expended in flipping the core back to the region of its operating point 10 via point 14, rather than in producing a usable output at the output point 44. Thus, as will be seen from the foregoing discussion, the application of an input pulse during the occurrence of a negative-going portion of the applied power pulse will effectively prevent the output of a usable pulse during the next succeeding positive-going power pulse. The system thus acts as a complementer.

While the foregoing description has set forth in essence the operation of a complementing magnetic amplifier in accordance with the present invention, several further design considerations should be noted. First of all, even though during the time interval $t5$ to $t6$ for instance, the energy in the positive-going power pulse is expended in merely flipping the core from its minus remanence to its plus remanence operating point, a small output termed a sneak output may still appear at the point 44. Such sneak outputs are effectively suppressed by the combination of resistor R1 and diode D3 connected as shown in Figure 6. This suppression is effected by so choosing the magnitude of resistor R1 that a current flows from ground through the said diode D3 and resistor R1 to a source of negative potential —V, which current is equal to or greater than the magnitude of the sneak pulse current to be suppressed. Because of the operation of diode D3 and resistor R1, therefore, only outputs larger than that of the sneak output may appear at point 44.

Again, the passage of energy through power winding 41, due to the application of a positive-going power pulse at the terminal 43, will cause a flux change to occur in the said coil 41 as described, and this flux change will in turn tend to induce a voltage in the signal coil 42. This induced voltage is negative at the cathode of D2 and positive at the cathode of D5; and although the induced voltage is small, if the core is at its operating point 10 when the positive-going power pulse is applied, it is nevertheless necessary to prevent current from flowing in the signal winding 42 due to this small induced voltage. The combination of resistor R2 and diode D5 accomplishes this function by allowing the lower end of signal winding 42, connected to the junction of the said resistor R2 and diode D5, to attain the power pulse potential when the power pulse is positive. Since the base level of an input pulse as applied through diode D2 is zero volts, no current can now flow due to the small induced voltage discussed previously. Further, if the core 40 should initially be at its minus remanence operating point 12 upon application of a positive going power pulse, a relatively large flux change occurs in the core and a relatively large voltage will be induced in the lower winding 42. The blocking action of the R2—D5 circuit still prevents current from flowing in the said lower winding 42 if there are fewer turns on signal winding 42 than there are on power winding 41. It is well known in the art that this relationship between the number of turns on the windings must exist if a voltage gain is to be produced by the amplifier.

Finally, it should be noted that when a power pulse such as is shown in Figure 5A is negative-going, only a negligible current can flow in the diode D1. Even though no current flows in diode D1, however, current will still flow during the application of a negative-going portion of the power pulse in the R2—D5 circuit, the magnitude of this current being approximately $$\frac{V}{R2}$$

This current serves to hold the end of signal winding 42 connected to the junction of resistor R2 and diode D5 at approximately ground potential; and as a result, signal inputs applied through the diode D2 during a negative-going power pulse portion pass through the said diode D2, through winding 42 as previously discussed, to the junction of resistor R2 and diode D5, which junction is approximately at ground potential. It should be further noted that the current which flows as a result of an input pulse through diode D2 must produce sufficient magnetizing force to flip core 40 from its plus remanence to its minus remanence operating point during the input pulse period. This value of current must not exceed the magnitude of $$\frac{V}{R2}$$

but this condition is easily arranged by proper choice of resistor R2.

Summarizing the foregoing briefly, it will be seen that the arrangement shown in Figure 6, and comprising the core 40 and the windings carried thereon, results in the provision of a complementing magnetic amplifier wherein outputs appear from the said amplifier so long as no input signal is presented thereto, and wherein outputs cease from the said amplifier during the application of a positive going power pulse immediately following the application of such an input pulse.

The arrangement shown in Figure 6 further includes a non-complementing magnetic amplifier such as may be employed in the present invention, and this further amplifier utilizes a magnetic core 50, again preferably but not necessarily exhibiting a hysteresis loop similar to that shown in Figure 1. The core 50 once more carries two windings thereon, namely, a power or output winding 51 and a signal or input winding 52. One end of the power winding 51 is coupled through a diode D6, poled as shown, to a source 53 of positive and negative-going phase 2 power pulses (Figure 5B).

Assuming now that the core 50 is initially at its —B*r* operating point 12, application of a positive-going power pulse during a time interval $t6$ to $t7$, at the point 53, will cause a current to flow through the diode D6 to winding 51 and thence through the diode D8 to output point 54. Inasmuch as this energy is for the most part expended in flipping the core 50 from its minus remanence operating point 12 to its plus remanence operating point 10, only a sneak output at best will appear at the output point 54 and this sneak output is again effectively suppressed by the combination of resistor R3 and diode D7, as was discussed above. Thus, during the time $t6$ to $t7$ for instance, the applied positive-going power pulse merely succeeds in flipping the core 50 from its minus remanence to its plus remanence operating point; and due to the action of sneak suppressor D7—R3, no output will appear at the point 54.

During the time interval $t7$ to $t8$, a negative-going power pulse is applied via the terminal 53 and this applied pulse effectively causes diode D6 to cut off. During this particular interval of time, therefore, a reverse current flows through the said power winding 51 from ground, through diode D7, thence through the said winding 51 and through resistor R4 to the source of negative potential —V. The value of this current is substantially $$\frac{V}{R4}$$

and R4 is so chosen that the current flow in the reverse direction through coil 51 is sufficient to flip the core during the time interval *t*7 to *t*8 from its plus remanence operating point 10 back to its minus remanence operating point 12 in a counter-clockwise direction. Thus, at the time *t*8, the core once more finds itself at its minus remanence operating point, and a further positive going power pulse applied via terminal 53 during the time *t*8 to *t*9 will again merely flip the core to its plus remanence operating point without effecting an output. Thus, in the absence of any input signals, the core is regularly flipped between —B*r* and +B*r* and back to —B*r*, without there being any output.

If we should now assume that an input pulse (Figure 5D), should appear at the point 44 during a time interval *t*9 to *t*10, this input pulse will cause current to flow through the input winding 52 and will subject the core 50 to a supplemental magnetizing force. As will become apparent from an examination of the winding directions shown in Figure 6, the magnetizing force effected by coil 52 during the time *t*9 to *t*10 is in a direction opposite to that effected by the reverse current flow through coil 51 during this same time period. The magnetizing effect of the said reverse current flow through winding 51 is therefore effectively nullified and at the end of the time period *t*9 to *t*10 the core 50 will find itself remaining at the operating point 10. Application of a further positive-going pulse during the time interval *t*10 to *t*11 (Figure 5B) will therefore cause a substantial output to appear via the winding 51 and diode D8 at the output point 54. If a further input pulse is not applied during a succeeding negative-going power pulse, the reverse current flow through winding 51 will again cause the core 50 to flip back to its minus remanence operating point and no output will appear during the next succeeding positive-going power pulse, etc. Thus, the arrangement shown in Figure 6, and utilizing the core 50 and the windings carried thereon, effects a non-complementing magnetic amplifier wherein an output appears at the point 54, during the application of a positive-going power pulse, only if an input were applied to the winding 52 during the next preceding negative-going power pulse. In this respect, therefore, it should be noted that the operation of a non-complementing magnetic amplifier corresponds to an active delay means and appropriate passive delay means, or other forms of delay, may accordingly be substituted for the non-complementing amplifier shown.

One other design consideration should be noted. Current flow through the winding 51 will, in the absence of other circumstances, establish flux changes tending to induce a voltage in the signal input coil 52. In order to protect the input circuit, connected to diode D4 for instance, against any interference from current flowing in the power winding 51, the signal winding 52 is returned to a positive voltage +E as shown, which positive voltage is equal and opposite in value to the voltage induced or generated in it by current flowing in the power winding 51 when reverse current in fact flows through the said winding 51.

Figure 2:
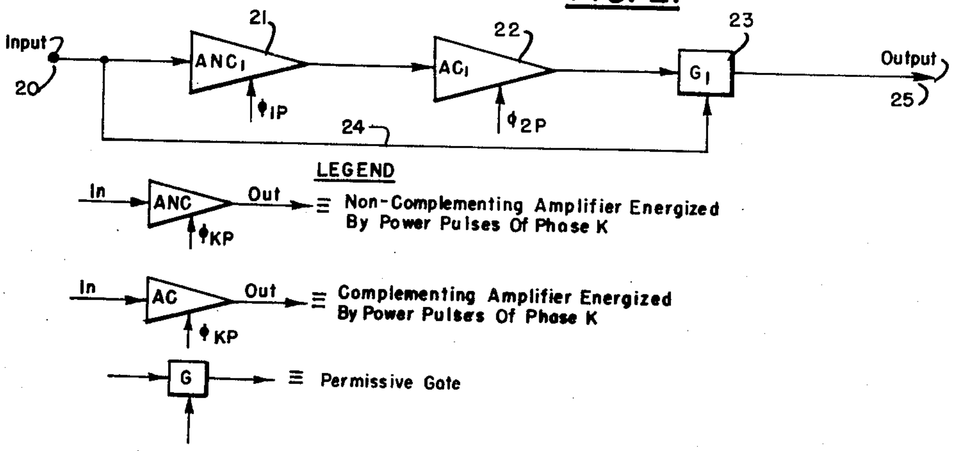
Figure 2 is a logical diagram of a differencer circuit in accordance with one form of the present invention, and includes a legend descriptive of the various symbols utilized.

Returning now to the logical diagram shown in Figure 2, it will be seen that, in accordance with one form of the present invention, a differencer circuit may utilize a non-complementing magnetic amplifier 21 of the type discussed above, energized by phase 1 power pulses. The output of the said amplifier 21 is coupled to the input of a complementing magnetic amplifier 22, in turn energized by phase 2 power pulses, and the output of the said amplifier 22 may be fed to one control input of a permissive gating device 23. A source of selectively applied input pulses 20 is coupled to the input of the non-complementing magnetic amplifier 21, as well as to a further control input of the gating device 23 via a line 24, and the output of the system appears from the gating device 23 at an output point 25. The arrangement thus provided utilizes an amplifier chain comprising a non-complementing magnetic amplifier and a complementing magnetic amplifier; and, as will become apparent from the following description, this chain will produce outputs continuously up to and including the time of arrival of the first of a series of input pulses appearing at terminal 20. The amplifier chain will then produce no outputs until the second pulse period after the series of input pulses has ended whereby, through the agency of the gate 23, only a single pulse will appear at the output point 25, corresponding to the beginning of the input series of pulses at point 20.

Figure 3:
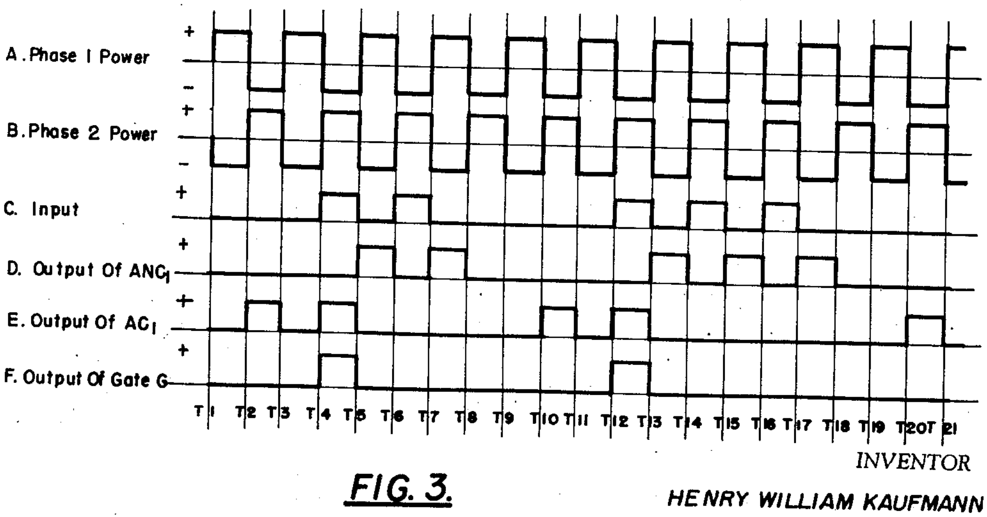
Figure 3 (A through F) is a waveform diagram illustrating the operation of the circuit shown in Figure 2.

Referring now to Figure 3, it will be seen that in the absence of an input pulse at point 20, the non-complementing magnetic amplifier 21 will produce no outputs during the time intervals *t*1 to *t*2, and *t*3 to *t*4 for instance. This lack of output from the non-complementing amplifier 21 results in there being no input to the complementing magnetic amplifier 22 during these time periods, whereby the said amplifier 22 will produce output pulses during the time intervals *t*2 to *t*3, and *t*4 to *t*5 (Figure 3E). If now an input pulse should appear at the terminal 20 during the time interval *t*4 to *t*5, this input pulse will be coupled via the line 24 to the gate 23 and will coincide with an output pulse appearing from the amplifier 22 during this interval *t*4 to *t*5. The gate 23 will accordingly pass an output to point 25 during this time interval *t*4 to *t*5 (Figure 3F).

The input pulse appearing at terminal 20 during the time interval *t*4 to *t*5 is also coupled to the input of non-complementing magnetic amplifier 21 during this time interval and the said amplifier 21 will accordingly produce an output pulse during the time interval *t*5 to *t*6 (Figure 3D). This output pulse will in turn act as a phase 2 input pulse to the complementing magnetic amplifier 22, thereby suppressing an output from the said amplifier 22 during the time interval *t*6 to *t*7. A further input pulse appearing at terminal 20 during the time interval *t*6 to *t*7 will have a similar effect in that it causes magnetic amplifier 21 to produce a still further output pulse during the time interval *t*7 to *t*8, once more suppressing the output of complementing magnetic amplifier 22 during the time interval *t*8 to *t*9. If the input train of pulses should effectively end at the time *t*7, as shown, the absence of a pulse input at terminal 20 during the time interval *t*8 to *t*9 will result in there being no output from amplifier 21 during the time interval *t*9 to *t*10 whereby the complementing amplifier 22 will once more produce an output during the time interval *t*10 to *t*11 and the circuit will revert to its original state.

Examining the waveforms shown in Figure 3 for the time interval *t*1 to *t*11, therefore, it will be seen that the application of a train of input pulses results in the production of but a single output pulse corresponding to the beginning of the said train at the output point 25. The action of the circuit for a further train of input pulses appearing during the time intervals *t*12 to *t*13, *t*14 to *t*15 and *t*16 to *t*17 has also been shown in Figure 3, and once more it will be seen that the circuit operates to produce only a single output pulse appearing during the time interval *t*12 to *t*13 and corretsponding to the beginning of the input pulse train. The circuit shown in Figure 2 thus operates as a differencer to effect the purposes described previously.

In operation, the complementing and non-complementing amplifiers comprising the amplifier chain of the present invention may be connected together in an arbitrary order. Thus, referring to Figure 4, it will be seen that the input pulses may in fact be applied to a complementing amplifier rather than to the non-complementing amplifier shown in Figure 2, and the output of the said complementing amplifier will then act as an input to a non-complementing amplifier which in turn controls a gating device. Thus, referring to the arrangement shown in Figure 4, an input terminal 30 may be supplied with selectively applied trains of input pulses coupled to the input of a complementing amplifier 31, as well as to one control input of a gating device 33 via line 34. The output of the said complementing amplifier 31 in turn acts as the input to a non-complementing amplifier 32 and the output of the said amplifier 32 supplies a further control input of the gate 33. The output of the gate 33 appears at the point 35, in accordance with the preceding discussion.

Referring now to the waveforms of Figure 5, it will be seen that in the absence of input pulses, the complementing amplifier 31 will produce output pulses during the time intervals *t1* to *t2*, and *t3* to *t4* (Figure 5D). These output pulses from amplifier 31 will in turn act as input pulses to non-complementing amplifier 32 and will cause the said amplifier 32 to produce further output pulses appearing during the time intervals *t2* to *t3* and *t4* to *t5* (Figure 5E). If now an input pulse should be applied via terminal 30 during the time interval *t4* to *t5*, this input pulse will coincide with the pulse output from amplifier 32 during the time interval *t4* to *t5* and will cause the gating device 33 to pass an output to the output point 35 during this time interval *t4* to *t5* (Figure 5F).

The application of a still further input pulse at the terminal 30 during the time interval *t6* to *t7* will suppress the output from amplifier 31 during the time interval *t7* to *t8*, which will in turn prevent there being any input to non-complementing amplifier 32, and amplifier 32 will produce no output during the time interval *t8* to *t9*. The arrangement thus operates once more to provide but a single output pulse coinciding with the beginning of a series of input pulses. The operation of the circuit shown in Figure 4, for a further train of input pulses, is similarly shown by the waveforms appearing during the time intervals *t12* to *t17* and, as was discussed previously, a single output pulse only is effected corresponding to the beginning of a train of input pulses. Thus, comparing Figures 2 and 4, it will be seen that the present invention effects a differencer circuit by employing a chain of complementing and non-complementing amplifiers connected in arbitrary order, the input of the chain being provided with the input trains in question and the output of the chain acting as one control for a gating device.

Figure 4:
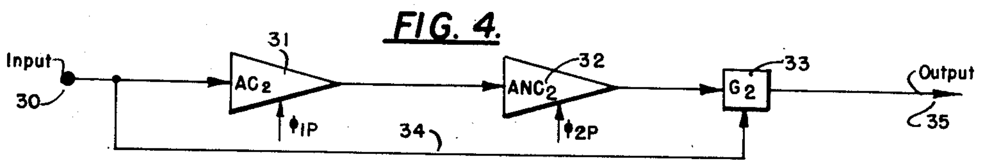
Figure 4 is a further logical diagram of a differencer circuit in accordance with a further embodiment of the present invention.

The circuit shown in Figure 4 may be constructed in accordance with the schematic shown in Figure 6 when it is desired to use magnetic amplifiers. The several amplifiers shown in the said Figure 6 have already been discussed and the function of the various components will be clear from that discussion. The gating device 33 is represented by the arrangement employing resistors R5, R6 and R7 in conjunction with the rectifiers D8, D9 and clamping rectifier D10. Rectifier D11 and the output point 55 shown in Figure 6 correspond to the output terminal 35 of Figure 4. Similarly, the input 45 of Figure 6 corresponds to the input point 30 of Figure 4 and the line 34 of Figure 4 corresponds to the line including the rectifier D12 of Figure 6. The individual amplifiers shown in Figure 6 may also be reversely connected to effect a circuit configuration in accordance with the logic of Figure 2.

While I have described preferred embodiments of the present invention, it must be understood that the foregoing description is meant to be illustrative only and is not limitative of my invention. Many variations will be suggested to those skilled in the art and all such variations are meant to fall within the scope of the present invention as set forth in the appended claims.

Having thus described my invention, I claim:

1. A differencer circuit comprising a pulse generating circuit including a series connected complementing amplifier and delay means, gating means having a first input coupled to the output of said pulse generating circuit, and means selectively applying simultaneous input pulses to said pulse generating circuit and to a second input of said gating means, said gating means being responsive to simultaneity of pulses at the first and second inputs thereof for producing an output.

2. The circuit of claim 1 wherein said complementing amplifier comprises a pulse type magnetic amplifier.

3. The circuit of claim 2 wherein said magnetic amplifier includes a core of magnetic material exhibiting a substantially rectangular hysteresis loop.

4. The circuit of claim 1 wherein said delay means comprises a pulse type non-complementing magnetic amplifier.

5. A differencer circuit comprising first and second magnetic amplifiers, means coupling the output of said first magnetic amplifier to the input of said second magnetic amplifier, coincidence gating means having first and second inputs, said gating means being responsive to coincident pulses at said first and second inputs for producing an output pulse, means coupling said first input of said gating means to the output of said second magnetic amplifier, and means selectively coupling simultaneous input pulses to the input of said first magnetic amplifier and to said second input of said gating means.

6. The differencer circuit of claim 5 wherein said first magnetic amplifier is a complementing amplifier, said second magnetic amplifier comprising a non-complementing amplifier.

7. The differencer circuit of claim 5 wherein said first magnetic amplifier is a non-complementing amplifier, said second magnetic amplifier comprising a complementing amplifier.

8. The circuit of claim 5 wherein each of said magnetic amplifiers includes a core of magnetic material exhibiting a substantially rectangular hysteresis loop.

9. A pulse control circuit comprising a complementing magnetic amplifier, said amplifier comprising a core of magnetic material having an input winding and an output winding thereon, means coupling a source of regularly occurring power pulses to said output winding, delay means connected in series with said magnetic amplifier, gating means coupled to the output of said series connected amplifier and delay means, and means selectively coupling trains of input pulses to the input of said series connected amplifier and delay means and to a control input of said gating means whereby said gating means produces a single pulse at its output in coincidence with the first pulse only of each of said trains of input pulses.

10. The control circuit of claim 9 wherein said trains of input pulses are coupled to said input winding, said delay means being coupled between one end of said output winding and a control input of said gating means.

11. The control circuit of claim 9 in which said trains of input pulses are coupled to the input of said delay means, means coupling the output of said delay means to said amplifier input winding, and means coupling one end of said amplifier output winding to a control input of said gating means.

12. The control circuit of claim 9 in which said delay means comprises a non-complementing magnetic amplifier.

13. A pulse control circuit comprising amplifier means producing a train of regularly occurring pulses at its output in the absence of a signal input thereto, said amplifier means including means responsive to an input signal pulse for causing said pulse train to be interrupted, control means selectively coupling input signal pulses to the input of said amplifier, and gating means having a pair of input terminals coupled respectively to said control means and to the output of said amplifier means.

14. The pulse control circuit of claim 13 wherein said amplifier means comprises a complementing amplifier and a non-complementing amplifier connected in series with one another.

15. A pulse control circuit comprising amplifier means producing a pulse train at its output in the absence of an input signal thereto, said amplifier means being responsive to an input pulse for causing said pulse train to be interrupted and including delay means for causing said interruption to occur at a predetermined time interval subsequent to reception of an input signal pulse, gate means coupled to the output of said amplifier means, and means selectively coupling input signal pulses to said amplifier means and to said gate means, said input pulses being spaced from one another by a time interval no shorter than said predetermined time interval.

16. The pulse control circuit of claim 15 wherein said gate means comprises a normally closed gate.

17. The pulse control circuit of claim 15 wherein said amplifier means comprises a complementing magnetic amplifier coupled in series with said delay means.

18. The pulse control circuit of claim 17 in which said delay means comprises a non-complementing magnetic amplifier.

19. In combination, a signal generator having an input and an output and including means producing regularly spaced output signals at said output during predetermined spaced output time periods, said generator including means responsive to an input signal occurring during one of said spaced output time periods for inhibiting an output signal during a next subsequent output time period, a gating device having first and second gating control inputs, said gating device being responsive to coincident signals at said first and second gating control inputs for effecting a predetermined gating output state, means coupling the output of said pulse generator to one of said gating control inputs, and signal means coupling a control signal simultaneously to said generator input and to the other of said gating control inputs during a selected one of said output time periods.

20. The combination of claim 19 wherein said signal means includes means producing a train of regularly spaced signals whereby said gating means produces said predetermined gating output state in response to the first signal of said train only.

21. The combination of claim 20 wherein said signal generator comprises a complementing pulse type magnetic amplifier and a delay device connected in series with one another.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |